Patented Aug. 9, 1949

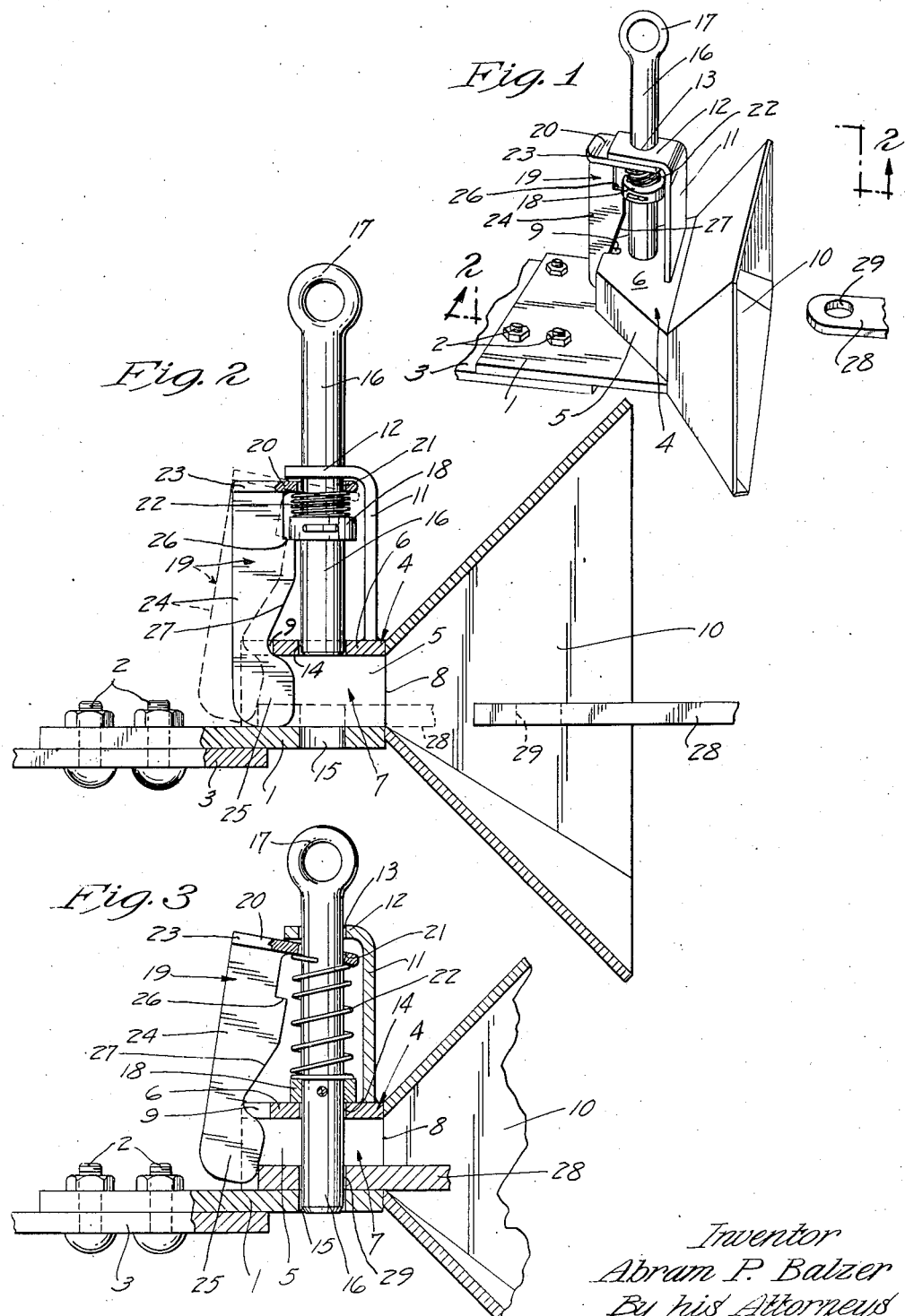

2,478,736

UNITED STATES PATENT OFFICE 2,478,736

VEHICLE COUPLING

Abram P. Balzer, Mountain Lake, Minn.

Application August 4, 1948, Serial No. 42,429

4 Claims. (Cl. 280—33.15)

1

My invention relates to new and useful improvements in couplers, and, more particularly, to the class of couplers which are automatically locked upon insertion of the free end of a draw bar into a coupling head.

More specifically, my invention is in the nature of an improvement upon couplers of the type disclosed in my co-pending application S. N. 756,938, filed June 25, 1947, and entitled "Coupler."

Still more specifically, it is the object of my invention to provide a coupler which is less expensive to construct, has fewer working parts, and is more foolproof than any coupler heretofore devised.

The above and still further objects and advantages of my invention will become apparent from the following detailed specification, appended claims, and attached drawings.

Referring to the drawings, in which like characters indicate like parts throughout the several views:

Fig. 1 is a perspective view of my novel coupler secured to a traction vehicle or the like, some parts being broken away;

Fig. 2 is a vertical section taken substantially on the line 2—2 of Fig. 1, some position of the parts being shown by dotted lines; and Fig. 3 is a view corresponding to Fig. 2, but illustrating a different position of some of the parts.

Referring with greater particularity to the drawings, the numeral 1 indicates a base plate adapted to be secured, by means of nut-equipped bolts or the like 2, to any portion of the framework 3 of a traction vehicle. A head 4, having forwardly-converging side walls 5 and an upper wall 6, is formed integrally with and projects upwardly from the base plate 1. The base plate 1, the side walls 5, and the top upper wall 6 define a cavity 7 having a relatively wide mouth 8 at its rear end and a relatively-restricted opening in the nature of a vertically-extended slot 9 at its forward end. A rectangular funnel-shaped guide element identified in its entirety by the numeral 10 projects rearwardly from the mouth 8 and forms an extension thereof.

An inverted L-shaped bracket 11 is secured, preferably by welding or the like, to the upper wall 6 of the head 4 and has an upper portion 12 which overlies the wall 6 in spaced relation thereto. The wall 6 and the base plate 1 are provided with aligned apertures 13, 14, and 15 respectively which slidably receive axially a coupling pin 16 which preferably, and as shown, is provided at its upper end with an eye or ring 17 to facilitate

2 manual movement thereof for setting purposes, as will hereinafter become apparent. The bracket 11 and aperture 13 provide, in effect, a guide bearing for the free end of the pin 16, particularly when it is in the retracted position of Fig. 2. Pin 16 at its intermediate portion is provided with an abutment in the nature of an annular collar 18 which overlies the upper wall 6 of the head 4 and underlies the upper portion 12 of bracket 11.

A latch lever, identified in its entirety by the numeral 19, is provided at its upper end with a plate-like arm 20 which is provided with an aperture 21 which loosely encompasses the coupling pin 16, whereby to permit limited rocking movements of said latch lever 19. As shown, a coil compression spring 22 is interposed between the collar 18 and the undersurface of the plate-like arm 20 of the latch lever 19. As will be seen, the coil spring 22 yieldingly biases the coupling pin 16 toward the extended position of Fig. 3 and simultaneously biases the plate 20 toward parallelism with the upper portion 12 of the bracket 11.

Depending from the projected end 23 of the plate 20 is a narrow arm 24, the free end 25 of which is received within the restricted opening or slot 9 at the front end of the head 4. Furthermore, the arm 24 is of sufficient depth to prevent accidental removal of the end 25 from the slot 9 upon rocking movements of the latch lever 19 with respect to the pin 16. The depending portion 24 of the latch lever 19 is notched away below the plate 20 to provide a shoulder 26 on the side edge of the arm 24 adjacent the coupling pin 16. The depending member 24 is also provided along its same edge with a cam portion or surface 27 which extends between the free end 25 and the shoulder 26.

The hitch above described is best adapted to be coupled to a draw bar or tongue 28 of a trailer or implement to be drawn, not shown. Tongue 28 is rounded at its front end and is provided with an aperture 29 which is adapted to receive the coupling pin 16. When it is desired to couple the tongue 28 to my novel structure, the coupling pin 16 is first manually elevated or retracted to the position of Figs. 1 and 2. It will be noted that in this operation the collar 18, during its upward movement, engages the cam surface 27 and moves the lever arm 24 sufficient to permit the collar 18 to pass upwardly thereby into a position above the shoulder 26. The compression of the spring 22 causes the arm 24 to be rockably moved into the full line position of Fig. 2 with the shoulder 26 underlying a portion of the collar 18. The pin 16 may then be released, thereby permitting the collar 18 to come to rest upon the shoulder 26, as shown by full lines in Fig. 2. As the perforate tongue 28 is guided into the head 4 through the funnel-shaped element 10 and mouth 8, it will be guided by the converging side walls 5 to the dotted line position of Fig. 2, at which position the aperture 29 is axially aligned with respect to the coupling pin 16, and the latch lever 19 will be rocked to the dotted line position therein. In said dotted line position, it will be observed that the collar 18 will be unseated from the shoulder 26 and the coil spring 22 will extend the coupling pin 16 to the position of Fig. 3 through the opening 29 in the tongue 28 and the opening 15 in the base plate 1.

It should be obvious that to release the tongue 28, it is but necessary to manually elevate or retract the coupling pin 16. By the arrangement shown, it will be seen that an extremely simple and efficient hitch utilizing but a single spring for both advancing the coupling pin to a coupling position and resetting the latch lever 19 for automatic coupling action is provided.

My invention has been thoroughly tested and found to be entirely adequate for the accomplishment of the above objects, and while I have shown and described a single embodiment thereof, it will be understood that the same is capable of modification without departure from the spirit and scope of the invention as defined in the claims.

What I claim is:

1. In a draw bar hitch adapted to be connected to a traction vehicle, a hollow coupling head having a relatively wide mouth at one end for reception of the apertured end of a draw bar and having a relatively-restricted opening at its opposite end, said head defining spaced internal guide surfaces that converge from said mouth toward said restricted opening and which serve to center and stop the apertured end of a draw bar inserted into said head through said mouth, a coupling pin axially slidably mounted in aligned openings in opposite walls of said head for extending and retracting movements with respect to the cavity of said head, a guide bearing associated with the head and encompassing the coupling pin in spaced relation to the head, an abutment on said coupling pin intermediate said head and said guide bearing, a latch lever, said latch lever having one end loosely encompassing the coupling pin intermediate said guide bearing and said abutment whereby to permit limited rocking movements of said lever with respect to said coupling pin, the opposite free end of said lever being adapted to be projected into the cavity of said head through said restricted opening upon rocking movements of the lever, a shoulder on said latch lever intermediate its ends and engageable with the abutment on said coupling pin to releasably retain said coupling pin in restricted inoperative position, and a coil compression spring surrounding said coupling pin intermediate said abutment and said lever, said spring biasing said coupling pin toward operative engagement with said draw bar within said cavity and biasing the free end of said latch lever in the direction of the coupling pin.

2. The structure defined in claim 1 in which said abutment is in the nature of an annular collar.

3. The structure defined in claim 1 in which said latch lever is also provided with a cam surface intermediate its free end and the shoulder thereof, said cam surface being engageable by said abutment whereby to permit automatic positioning of the abutment on said shoulder upon retracting movements of said coupling pin.

4. The structure defined in claim 1 in which the restricted opening is in the nature of a slot, and in which the free end of said lever has sufficient depth to prevent its accidental removal from the slot under rocking movements thereof.

ABRAM P. BALZER.

No references cited.